Patented July 13, 1926.

1,592,307

UNITED STATES PATENT OFFICE.

WINFIELD SCHLEY LIENHARDT, OF STAPLETON, NEW YORK, ASSIGNOR TO METAL & THERMIT CORPORATION, OF CARTERET, NEW JERSEY, A CORPORATION OF NEW JERSEY.

PROCESS OF RECOVERING NICKEL.

No Drawing. Application filed July 16, 1925. Serial No. 44,118.

This invention relates to processes of recovering nickel; and it comprises a method of recovering nickel from acid solutions containing comparatively small amounts of nickel and comparatively large amounts of sulfuric acid, wherein such solutions are brought into contact with extensive surfaces of a metal higher than nickel in the electromotive series, this metal usually being iron, although zinc and other metals may be employed, and the precipitation of said nickel by said metal is facilitated by adding to the liquor, prior to such contact, a soluble sulfate of a metal not precipitated by iron, this soluble sulfate being sometimes a sulfate of an alkali metal and sometimes iron sulfate itself; the iron sulfate, where used, being sometimes secured by returning a portion of stripped liquor for admixture with fresh liquor; all as more fully hereinafter set forth and as claimed.

In another and copending application, Serial No. 34,868, filed June 4th, 1925, I have described and claimed a process of recovering nickel from acid liquors containing the metal in relatively small amounts, such as waste acid liquors from copper refineries, exhausted plating solutions, acid solutions used in leaching ores containing nickel, etc. These liquors are generally heavily acid with sulfuric acid. In this method, I flow or otherwise contact the acid liquor with extensive surfaces of a metal more positive than nickel, this metal usually being iron, such as scrap iron, borings, shavings, chips, etc. The metal (iron) goes into solution and the nickel is thrown down, generally in a sludge or mud form, as a loosely adhering deposit readily removable from the iron either by the flow of the solution itself or by a washing operation. Generally the operation is performed at a temperature of 60° C. or higher, for the sake of quickness of action and completeness of stripping. Usually the liquors are highly acid, the acidity sometimes being as high as 18—20 per cent $H_2SO_4$. Ordinarily, the iron is used in large excess of the amount required to react to completion with the acid present.

I have now found that it much facilitates this operation to add a certain proportion of a preformed sulfate to the liquor before contacting it with metallic iron. A wide variety of water soluble sulfate salts may be used, although of course none is useful which contains a metal precipitated by iron. I may mention as examples of sulfates which I have used, sodium sulfate, potassium sulfate, ammonium sulfate, magnesium sulfate, iron sulfate, aluminum sulfate, manganese sulfate, zinc sulfate. Acid sulfates may also be used effectively. As examples of these, I may mention sodium acid sulfate and potassium acid sulfate. Iron sulfate is a cheap and convenient salt which may be used effectively. As the exhausted or stripped liquors coming from the process carry considerable amounts of iron as sulfate it is possible to furnish iron sulfate to the liquor to be stripped by simply admixing it with more or less liquor which has been through the process; that is, liquor which is to be flowed over the iron and stripped of nickel may consist in part of fresh liquor and in part of liquor which has already gone through the apparatus. As such recirculated liquor gives a greater dilution however I ordinarily deem it more advantageous to add iron sulfate in solid form. A compromise is possible, some portion of iron sulfate being furnished by returned liquor with an addition of solid sulfate, or liquor to be returned may be concentrated. Mixtures of sulfates may be used.

By the addition of a sulfate to the liquor prior to stripping by iron, the operation is much facilitated. As illustrating the improvement resulting from the admixture of the sulfate, I may recite certain work done. The same crude solution was used containing 17.64 per cent sulfuric acid and 2.5 grams of nickel per 100 cc. Operating under parallel conditions on this liquor without additions, with an addition of 40 grams ferrous sulfate ($FeSO_4.7H_2O$) per 100 cc., and with the liquid completely saturated with ferrous sulfate, at 95° C., the best results were found with the third solution, although the second was nearly as good. In detail, at the end of 30 minutes, at 95° C., from the first or untreated solution, 1.29 grams of nickel were precipitated from each 100 cc., while from the solution containing 40 per cent ferrous sulfate in the same time and at the same temperature, 1.59 grams were thrown down. From the solution saturated with ferrous sulfate, using the same time and temperature, 1.64 grams nickel were thrown down. An important saving is effected in the amount of iron necessary for precipitation. In the three cases just mentioned, the amount of iron used per gram of nickel thrown down was respectively 7.74 grams, 6 grams and 5.70 grams.

In parallel work, using the same solution and other sulfates, similar results were obtained. One lot of the liquor was saturated with sodium sulfate at 95° C.; another lot contained 5 grams ammonium sulfate per 100 cc.; and still another contained 5 grams sodium acid sulfate (niter cake) 100 cc. As before, the liquors were treated with a large excess of metallic iron at a temperature of about 95° C. At the end of 30 minutes, a check solution containing no added sulfate gave 1.32 grams per 100 cc., as contrasted with 1.29 grams in the preceding work. The solution saturated with sodium sulfate hot yielded 1.67 grams of nickel per 100 cc., the solution containing ammonium sulfate gave 1.65 grams nickel, or about the same, and the solution containing acid sodium sulfate gave 1.97 grams of nickel. With a check untreated solution, 7.15 grams of iron were consumed for each gram of nickel precipitated, while with the solution saturated with sodium sulfate hot but 5.97 grams iron were consumed. The solution containing niter cake consumed but 5.04 grams iron per gram of nickel. In using sodium sulfate in this way the stripped liquor contains both sodium sulfate and iron sulfate and may be used as a source of either or both.

From the results of this work, it is clearly evident that the addition of a sulfate to the liquor to be stripped increases the amount of nickel precipitated in a given time and decreases the amount of iron necessary for the precipitation.

What I claim is:

1. In processes of recovering nickel from sulfuric acid solutions by the use of metals higher than nickel in the electromotive series of metals as precipitant, the addition of a sulfate of a metal not precipitated by iron to such solutions prior to contacting the same with the precipitating metal.

2. In processes of recovering nickel from sulfuric acid solutions by the use of iron as precipitant, the addition of a sulfate of a metal not precipitated by iron to such solutions prior to contacting the same with iron.

3. In the recovery of nickel from solutions containing the same and acid with sulfuric acid, the process which comprises adding sulfate of iron to such a solution and thereafter contacting the solution with extensive surfaces of metallic iron.

4. In the recovery of nickel from acid solutions containing the same and also containing sulfuric acid, the process which comprises admixing the liquor with sulfates from stripped liquor which has gone through the process and contacting the mixture with extensive surfaces of metallic iron, a portion of the liquor which has gone through the process serving as a source of sulfates to be added to liquor to go through.

In testimony whereof I affix my signature.

WINFIELD SCHLEY LIENHARDT.